United States Patent
Boysko et al.

(10) Patent No.: US 8,051,168 B1
(45) Date of Patent: Nov. 1, 2011

(54) METHOD AND SYSTEM FOR SECURITY AND USER ACCOUNT INTEGRATION BY REPORTING SYSTEMS WITH REMOTE REPOSITORIES

(75) Inventors: Glenn J. Boysko, Herndon, VA (US); William Hurwood, Washington, DC (US); Benjamin Z. Li, Great Falls, VA (US); Abhimanyu Warikoo, New York, NY (US)

(73) Assignee: Microstrategy, Incorporated, McLean, VA (US)

( * ) Notice: Subject to any disclaimer, the term of this patent is extended or adjusted under 35 U.S.C. 154(b) by 1812 days.

(21) Appl. No.: 09/883,300

(22) Filed: Jun. 19, 2001

(51) Int. Cl.
 *G06F 15/173* (2006.01)
(52) U.S. Cl. ........ 709/225; 709/218; 709/227; 713/152; 713/155; 713/161; 713/200; 713/201
(58) Field of Classification Search .......... 709/218, 709/225, 227, 229, 203, 223; 713/152, 155, 713/161, 169, 200, 201; 707/9, 513; 726/3, 726/8, 15, 19; 716/152, 155, 161, 200, 201
See application file for complete search history.

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 5,197,005 A | 3/1993 | Shwartz | |
| 5,276,870 A | 1/1994 | Shan | |
| 5,418,943 A | 5/1995 | Borgida | |
| 5,421,008 A | 5/1995 | Banning | |
| 5,555,403 A | 9/1996 | Cambot | |
| 5,584,024 A | 12/1996 | Shwartz | |
| 5,664,182 A | 9/1997 | Nirenberg | |
| 5,692,181 A | 11/1997 | Anand | |
| 5,864,856 A | 1/1999 | Young | |
| 5,914,878 A | 6/1999 | Yamamoto | |
| 6,081,900 A * | 6/2000 | Subramaniam et al. | 726/19 |
| 6,088,451 A * | 7/2000 | He et al. | 726/8 |
| 6,092,196 A * | 7/2000 | Reiche | 713/200 |
| 6,151,628 A * | 11/2000 | Xu et al. | 709/225 |
| 6,154,766 A | 11/2000 | Yost | |
| 6,158,011 A * | 12/2000 | Chen et al. | 726/15 |
| 6,247,008 B1 | 6/2001 | Cambot | |
| 6,275,939 B1 * | 8/2001 | Garrison | 713/200 |
| 6,279,033 B1 | 8/2001 | Selvarajan | |
| 6,438,550 B1 * | 8/2002 | Doyle et al. | 707/9 |
| 6,453,353 B1 * | 9/2002 | Win et al. | 709/229 |
| 6,539,021 B1 * | 3/2003 | Kennelly et al. | 370/401 |
| 6,640,302 B1 * | 10/2003 | Subramaniam et al. | 713/169 |
| 6,654,891 B1 * | 11/2003 | Borsato et al. | 713/201 |
| 6,658,432 B1 * | 12/2003 | Alavi et al. | 1/1 |
| 6,662,231 B1 * | 12/2003 | Drosset et al. | 709/229 |
| 6,732,179 B1 * | 5/2004 | Brown et al. | 709/229 |

(Continued)

OTHER PUBLICATIONS

"Single Sign-On using Cookies for Web Application" Vipin Samar, Jun. 16, 1999, pp. 158-163, XP010358606.*

(Continued)

*Primary Examiner* — Thu Ha Nguyen
(74) *Attorney, Agent, or Firm* — Hunton & Williams, LLP

(57) ABSTRACT

The present invention presents security and user account integration with remote authentication servers, (e.g., repositories not owned by the server). Integration may occur with Lightweight Directory Access Protocol (LDAP), an operating system (e.g., Microsoft Windows™ NT™) authentication, custom account repositories and others. For example, the server may synchronize associated user lists with a remote repository. In another example, the server may also make external calls to remote authentication servers to validate a user's username and password. Other information may be validated.

20 Claims, 12 Drawing Sheets

U.S. PATENT DOCUMENTS

| | | | | |
|---|---|---|---|---|
| 6,763,468 B2* | 7/2004 | Gupta et al. | | 726/2 |
| 6,904,449 B1* | 6/2005 | Quinones | | 709/203 |
| 7,024,687 B2* | 4/2006 | Chaudhuri et al. | | 726/3 |
| 7,082,422 B1* | 7/2006 | Zirngibl et al. | | 706/45 |
| 7,231,433 B1* | 6/2007 | Hellbusch et al. | | 709/219 |
| 7,356,840 B1* | 4/2008 | Bedell et al. | | 726/13 |
| 7,698,398 B1* | 4/2010 | Lai | | 709/223 |
| 7,930,412 B2* | 4/2011 | Yeap et al. | | 709/229 |
| 2002/0083095 A1* | 6/2002 | Wu et al. | | 707/513 |
| 2002/0122553 A1* | 9/2002 | Kao et al. | | 380/28 |
| 2002/0123957 A1* | 9/2002 | Notarius et al. | | 705/37 |
| 2002/0143655 A1* | 10/2002 | Elston et al. | | 705/26 |
| 2002/0176582 A1* | 11/2002 | Aull | | 380/279 |
| 2003/0149781 A1* | 8/2003 | Yared et al. | | 709/229 |
| 2003/0158945 A1* | 8/2003 | Liu | | 709/227 |
| 2003/0217333 A1* | 11/2003 | Smith et al. | | 715/513 |
| 2010/0306179 A1* | 12/2010 | Lim | | 707/688 |
| 2011/0023117 A1* | 1/2011 | Brown et al. | | 726/22 |

OTHER PUBLICATIONS

Security assertions markuo language. Core assertion architecture-Examples and Explanations, Hallam Baker P, May 14, 2001, XP002215730.*

Robert C. Stern, Bruce M. Anderson and Craig W. Thompson, A Menu-Based Natural Language Interface to a Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces to Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

Business Objects User's Guide Version 5.1.
Getting Started with Business Objects Version 5.1.
Business Objects Deployment Guide.
Broadcast Agent 5.1.
Business Objects 5.1.
Web Intelligence 2.6.
Business Objects Designer's Guide Version 5.1.
Business Objects Error Message Guide Version 5.1.
Business Objects Generic ODBC Access Guide Version 5.1.
Business Objects Info View User's Guide.
Business Objects Installation and Upgrade Guide.
Business Objects MS Access Database Guide Version 5.1.
Business Objects MS SQL Server Database Guide Version 5.1.
Business Objections Supervisor's Guide Version 5.1.
Quick Start MicroStrategy Agent Version 6.0.
User Guide MicroStrategy Agent Version 6.0.
User Guide MicroStrategy Architect Version 6.0.
User Guide MicroStrategy Objects Version 6.0.
Excel Add-In MicroStrategy Objects Version 6.0.
User Guide MicroStrategy Intelligence Server Version 6.0.
User Guide MicroStrategy Administrator Version 6.0.
Administrator Guide MicroStrategy Administrator Version 6.5.

* cited by examiner

| SECURITY FILTER | 410 |
|---|---|
| FILTER: | STORE = DC |
| TOP: | STORE |
| BOTTOM: | EMPTY |

| SECURITY FILTER | 420 |
|---|---|
| FILTER: | STORE = DC |
| TOP: | MARKET |
| BOTTOM: | EMPTY |

| SECURITY FILTER | 430 |
|---|---|
| FILTER: | EMPTY |
| TOP: | REGION |
| BOTTOM: | EMPTY |

FIG. 4

| | |
|---|---|
| SECURITY FILTER 1: | <u>510</u> |
| FILTER: | REGION=EAST |
| TOP: | EMPTY |
| BOTTOM: | MARKET |
| SECURITY FILTER 2: | <u>520</u> |
| FILTER: | REGION=CENTRAL |
| TOP: | MARKET |
| BOTTOM: | EMPTY |
| SECURITY FILTER 1 & 2: | <u>530</u> |
| FILTER: | REGION IN (EAST, CENTRAL) |
| TOP: | EMPTY |
| BOTTOM: | MARKET |

FIG. 5

METHOD AND SYSTEM FOR SECURITY AND USER ACCOUNT INTEGRATION BY REPORTING SYSTEMS WITH REMOTE REPOSITORIES

FIELD OF THE INVENTION

The present invention relates generally to implementing security features for reporting systems, such as decision support, Business Intelligence, on-line analytical processing and other systems, in particular, to a method and system for integrating security and user account data with remote repositories.

BACKGROUND OF THE INVENTION

Decision support systems have been developed to efficiently retrieve selected information from data warehouses. One type of decision support system is known as an on-line analytical processing system (OLAP). Other systems may include Business Intelligence and reporting systems. In general, OLAP systems analyze the data from a number of different perspectives and support complex analyses against large input data sets. OLAP systems generally output upon execution of a report that inputs a template to indicate the way to present the output and a filter to specify the conditions of data on which the report is to be presented.

Security is a major concern in any system. Large systems typically provide users with access to a wealth of information, not all of which is meant to be seen by everyone. In general, security systems may have the components related to authentication, access control and auditing. Authentication may include a method for identifying a user to the system. Access control may involve what the user is allowed to see and do once the user has been identified. Auditing may include a record of the data the user viewed and actions the user performed. Security may be generally implemented in various areas of a system, which may include databases, network/operating systems, and various applications.

Security at the database level is extremely important because anyone can bypass traditional security measures by using a simple, non-secure query tool to access the database or databases. Network controls access to computer while the operating system controls access to the files and applications that are stored in a particular computer. It is important to protect computers, sensitive files and other information from inadvertent or malicious tampering.

SUMMARY OF THE INVENTION

Integration with remote authentication servers may enable a user to access a reporting system wherein the user's account may be integrated with one or more authentication servers of remote systems. The present invention provides security and user account integration with remote authentication servers, (e.g., repositories not owned by the server). Integration may occur with Lightweight Directory Access Protocol (LDAP), an operating system (e.g., Microsoft Windows™ NT™) authentication, custom account repositories and others. For example, the server may synchronize associated user lists with a remote repository. In another example, the server may also make external calls to remote authentication servers to validate a user's username and password. Other information may be validated.

LDAP may relate to a directory-structured way to store data. In particular, many customers may use LDAP to store user information across an organization or customer-base. Rather than creating a new set of users within an entity and/or system, customers may use existing user information stored in LDAP to perform authentication, access checks and other functions.

Customers may use LDAP to authenticate users so that the users may use a single user ID and password. In addition, certificates may be used instead of user ID and password where appropriate. LDAP repositories may store information that describes properties, roles and rights of a user for authorization and other purposes. It may be possible to store vendor-specific information in a LDAP repository and enable applications to read from the LDAP repository rather than from a proprietary data store.

In addition, LDAP may support the concept of groups. For example, during authorization, LDAP groups may be associated with other groups at login. This may remove the need to administer user assignment to groups at both the LDAP and other level. For example, authentication may occur through a web site or other Internet user interface. As a result, the present invention may provide a way to achieve single-sign-on for web and other users.

The present invention provides a method and system for integrating security and user account data in a reporting system with at least one remote repository. A user may submit user credential input to a reporting system. The system may then identify an authentication process. User credential input may be forwarded to a server where the server may apply the authentication process to authenticate the user against a remote repository for verifying the user credential input. User information from the remote repository may be imported. The authentication process may include Lightweight Directory Access Protocol, operating system (e.g., Microsoft Windows™ NT™) authentication and other processes. The server may also synchronize user account data with the user information from the remote repository. In addition, the user may be associated with a group of users wherein group information from the remote repository may be imported. User information may include at least one or user permissions, privileges and access rights associated with the user.

Additional advantages of the invention will be set forth in part in the description which follows, and in part will be understood from the description, or may be learned by practice of the invention. The objects and advantages of the invention may be realized and attained by means of the instrumentalities and combinations particularly pointed out in the appended claims.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 4 illustrates examples of security filters, according to an embodiment of the present invention.

FIG. 5 illustrates an example of a combination of security filters, according to an embodiment of the present invention.

DETAILED DESCRIPTION OF PREFERRED EMBODIMENTS

Figure 1:
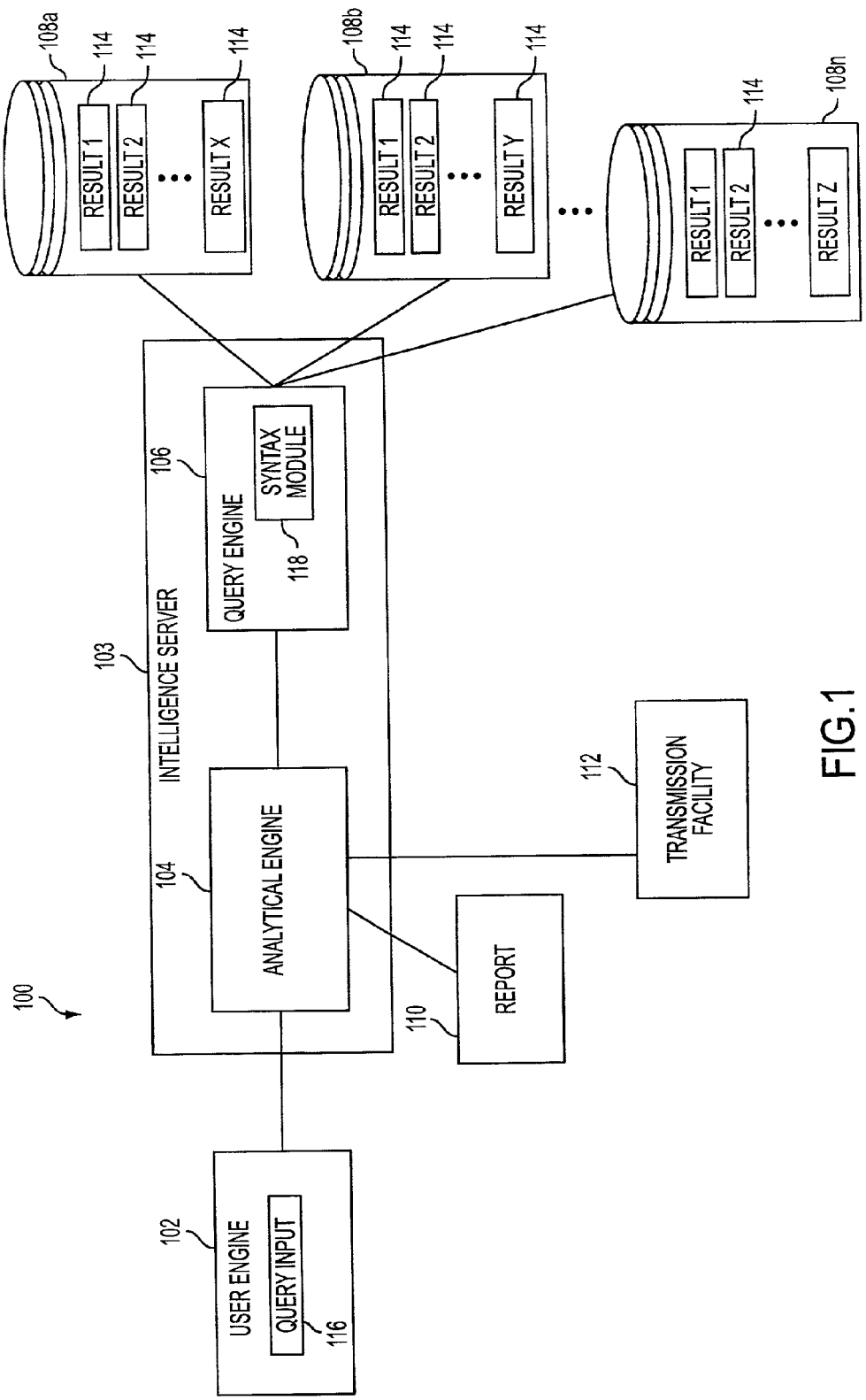
FIG. 1 is a block diagram illustrating an architecture for a system according to an embodiment of the invention.
Figure 2:
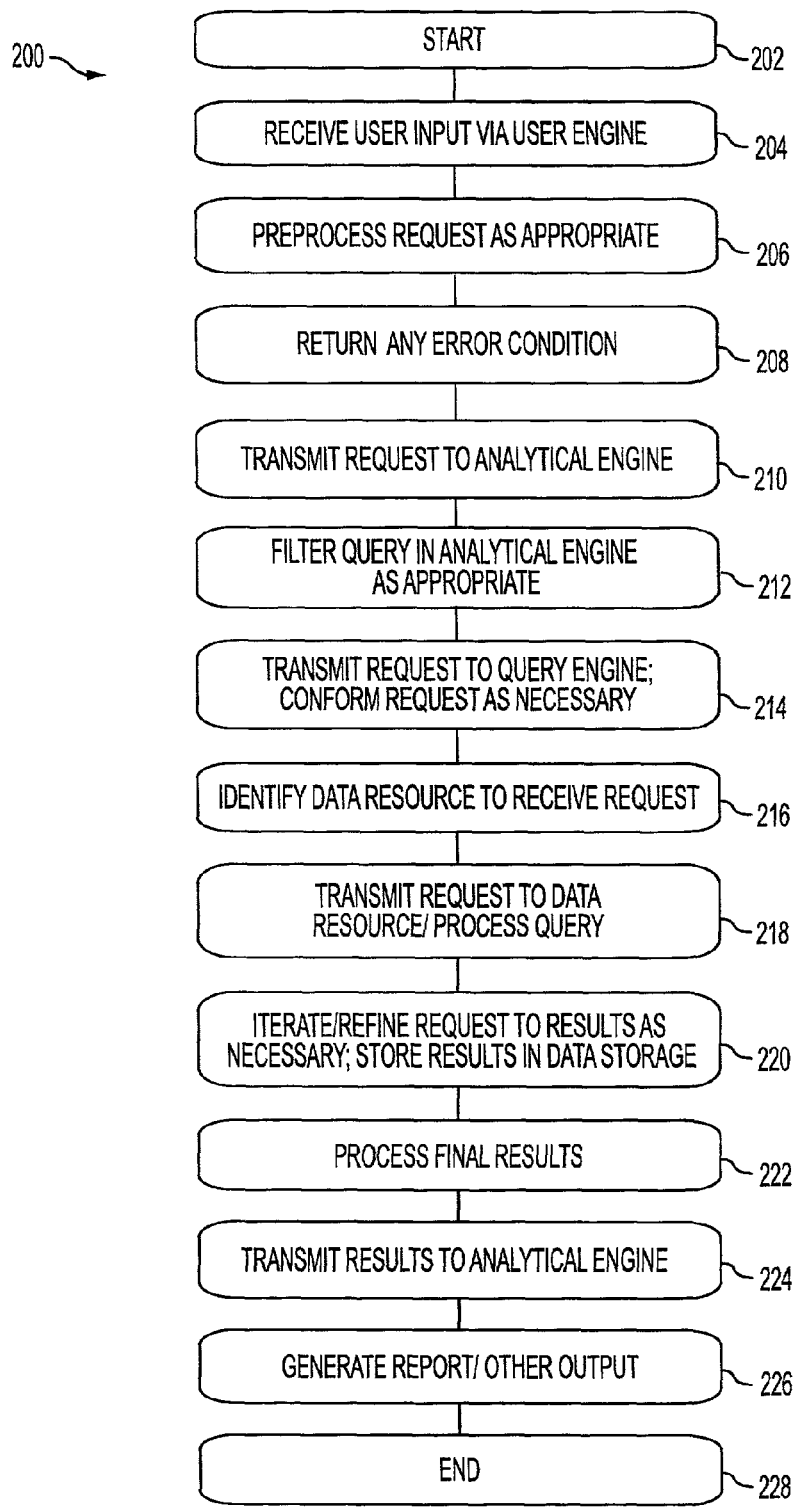
FIG. 2 is a flowchart illustrating steps performed by a process utilizing a query engine according to an embodiment of the invention.

While the present invention relates to security features for use in reporting systems, it will be helpful to have an example of such a system, according an embodiment of the present invention. FIG. 1 and FIG. 2 provide an example of a reporting system, such as an OLAP system, in accordance with the present invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a Macintosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by Micro Strategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the Micro Strategy 7 and 7.1 platform, the details of which will be appreciated by one of ordinary skill in the reporting and decision support system art.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Having described an example of an embodiment of an OLAP system, various features of security functionality will now be described below.

Figure 3:
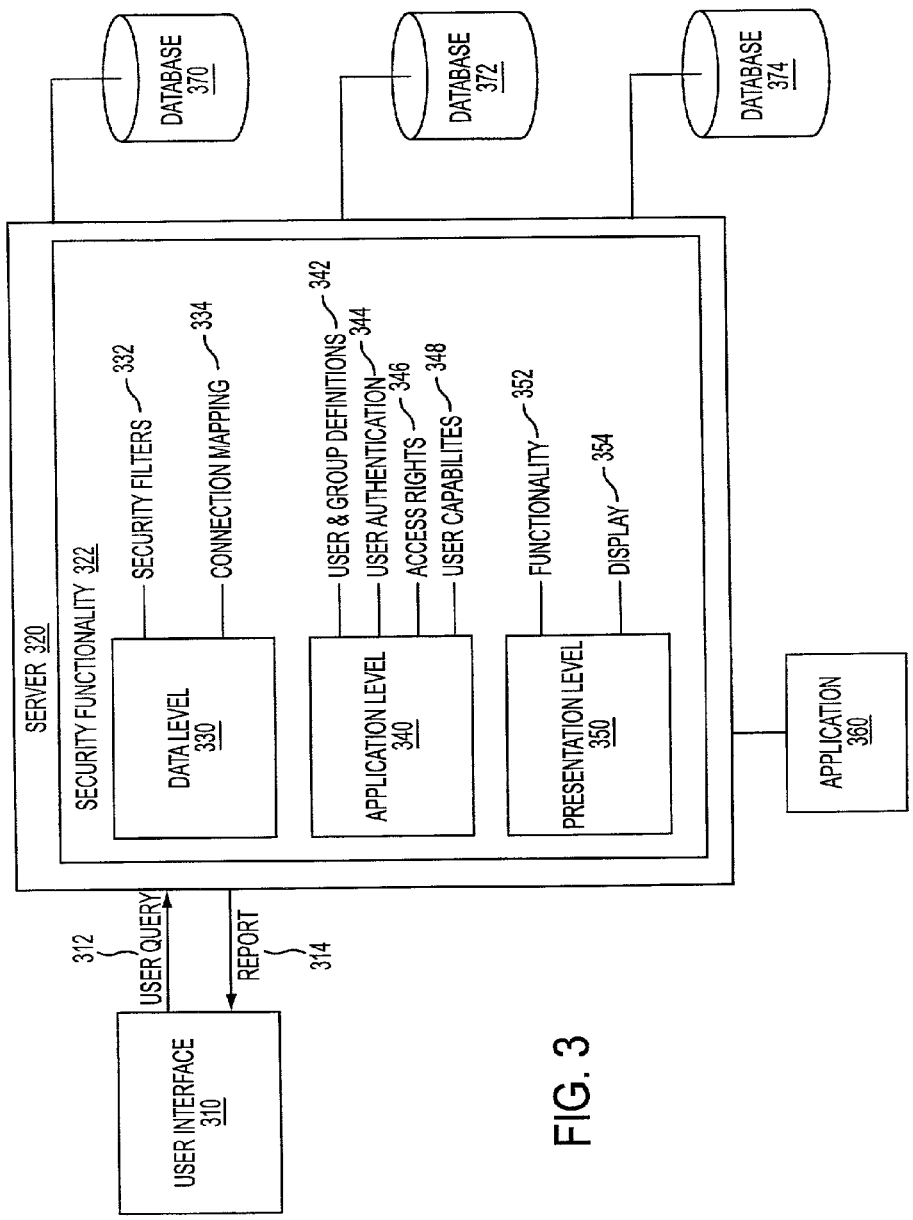
FIG. 3 is an example of security functionality applied to a reporting system, according to an embodiment of the present invention.

FIG. 3 is an example of security functionality applied to a business intelligence, OLAP or reporting system, according to an embodiment of the present invention. Via user interface 310, a user may interact with a Business Intelligence, OLAP, reporting or other system by submitting a user query, as illustrated by 312, or other input. Based on the user's query and/or other input, report 314 or other output may be generated. According to an embodiment with the present invention, security functions may be applied against the data used to generate the report (or other output). Security functions, as illustrated by 322, may apply at the data level as shown by 330, application level as shown by 340, and presentation level 350. Data level security functionality may monitor data retrieved from database servers and databases, as illustrated by 370, 372, and 374. Application level security functionality may regulate what the user may view and/or access as related to applications, as illustrated by 360. Presentation level security functionality 350 may monitor in what manner a user may view or access data, at the user interface 310, for example. Other levels of security may be addressed, in accordance of the present invention. More specifically, security functionality of the present invention may be implemented in decision support systems, such as business intelligence, OLAP, reporting, decision support, or other system as well as other environments.

Security at the data level may regulate access to data associated with underlying systems and/or applications. Access to data may be monitored by security filters 332, database connection mapping 334 and other mechanisms. Security filters may apply when a user attempts to access information via a query or other mechanisms. For example, the user may receive information filtered on what the user is allowed to view even if the user asks for a greater scope of information. Database connection mapping may enable groups of users to access information from a database or other resource. As a result, each user from a group may not be individually identified, but rather treated as a group of users with the same or similar level of access. In another example, particular users may be mapped to different database connections and different database logins.

Security at the application level may involve user or group definitions 342, user authentication 344, access rights 346, and user capabilities 348, for example. User and/or group definitions may involve a type of user, which may determine authority to view or access certain data. An authentication process may define what a user is allowed to see based on user credentials, other input and data. Access rights may apply at an individual object level and/or other levels. Examples of rights for an object may include Browse, Read, Write, Use/ Execute, Delete and Control. Other rights may be defined and implemented. Each object may have an associated Access Control List (ACL). The ACL may indicate which users/ groups have which access rights on a selected object. General capabilities for each individual item may include predefined questions (e.g., reports) and a user's capabilities, which may include one or any combination of read, write, modify, view, etc. Other capabilities may be applied.

Within applications, different user capabilities may be defined. User capabilities may include user functions, such as whether the user may create a new question, whether the user is restricted to predefined questions and other functions. User capabilities may also be based on privileges, security roles and other roles.

Security at the presentation level may involve how data may be displayed to an individual user or group of users, based on user data and other information. Presentation characteristics may include functionality 352, such as graphical user interfaces, and display factors 354, such as color scheme, position, and other display items. For example, certain users or groups may view the same or similar data in a different display based on user data (e.g., privileges, type of user, etc.) and other information. For example, certain information may be highlighted (e.g., order of data, color, font, functionality, etc.) to the user based on the user or user type. Security filters may be implemented to prevent users from viewing or otherwise accessing certain data in a database or other source of information. For example, if two users with different security filters run the exact same report, each user may receive different results because each user may have different levels of security or access. The type of security filter may be based on a user's role, capabilities, or other criteria. For example, a regional manager may have a security filter that allows a user to view data from the user's particular region regardless of the report the user runs.

Security filters may be implemented to address various security issues and concerns. A security filter may include a filter expression, a top level and a bottom level. Other elements may be included. A filter expression may specify a subset of data that a user may be authorized to analyze. A top level may specify the highest level of analysis to which the security filter may be applied. If a top level is not defined, the security filter may apply to any level that is higher than the bottom level. A bottom level may specify the lowest level of analysis to which this security filter may be applied. If a bottom level is not defined, the security filter may apply to any level that is lower than the top level. When neither top level nor bottom level is specified, the security filter may be applied to each level of analysis. In addition, security filters may vary by user and by fact or metric, such that for a given user at least one security filter may be defined for one fact or metric and another security filter for another fact or metric, thus providing different restrictions based not only on level but on the fact or metric the user accesses.

FIG. 4 illustrates examples of security filters, according to an embodiment of the present invention. For example, a store manager in DC may be granted authority to analyze the sales of a DC store, and nothing else, as illustrated by security filter 410. If the store manager wants to see information for a market or a region, the store manager may be restricted to data associated with the DC store. A user associated with the security filter below may analyze information for the DC store and levels lower. Any dimensionality above the store may be restricted to the specified store level.

Within a project, a security filter may be specified for each user or group of users. A user or a group may be associated with a different security filter for each project or group of projects. When a user submits an element browse request, a report execution request or other request, the security filter may be applied to the query.

In another example, a store manager in DC may be granted authority to analyze the sales of the DC store, as well as the sales information for its corresponding Northeast market, East region, and company as a whole. In this example, the store manager may access the entire Northeast level sales, entire region level sales, and entire company level sales. But the manager may not be able to analyze the store sales other than DC (for example, not NY store), other market sales, or other region sales.

A store manager in DC may be granted authority to analyze the sales of the DC store only, as well as the sales information for its corresponding Northeast market, all regions, and company as a whole. This may be slightly different than the previous example in that though the manager may be restricted to analyzing the DC store, Northeast market, the store manager may analyze region level sales for other regions (including East, West, and Central, for example).

Security filters may also limit a user's ability to analyze certain information to a certain level, but not any level lower. For example, a regional executive assistant in East Region may be granted authority to analyze the sales of the region and the sales of each market in the region, but not the sales for each individual stores. An analyst may be granted authority to analyze the sales information for each patient, and for each drug, but not for each drug per person.

In another example, the attribute "store" may have two parent attributes: market and channel. A store manager may be granted authority to analyze sales related to the store manager's store, the corresponding market sales, and the corresponding channel sales. But the store manager may be denied to access data related to sales by market and by channel. As security filters may enforce different limitations for different user/group, security filters may also enforce different limitations for different fact/fact group for the same (related or associated) user. The dimensionality of a metric may change a filter content. For example, given a filter with Store=DC. A dimensionality (e.g., region) may raise the filter to an East Region level, which may enable analysis of the region level information, even though the filter may be restricted to a single store. To limit this behavior, the dimensionality may be changed back to store. Thus, different Top Levels may be defined to serve various purposes.

According to an embodiment of the present invention, multiple filters may be implemented. In particular, different security filters may be applied to different analysis levels. Also, different exclusive security filters may be specified for different Top-Bottom ranges, as shown by security filters 420 and 430. This arrangement enables a user to perform analysis or other functions for the DC store, NE market and other regions (including East, West and Central) as well as the whole company.

Security filters may also vary by fact or metric. For example, a store manager may have access to sales for all stores within the store manager's region, but not have access to cost data (or other type of data) for any store, but the store manager's own store.

When a user logs into a project, the user may be associated with a set of security filters which may be used in addition to a report filter when running a report. For example, a set of security filters may be used to filter the attribute element browsing. Within a project, security filters for a user (or a group) may be specified as well as a security filter for a fact (or a fact group) for each user (or group).

User security filters may include a security filter associated with a user or group of users. The user security filter may be applied to some or all reports that a user (or any member of the group) may execute or otherwise access. The security filter may also be applied to element browsing and other functionality. When Top/Bottom levels are specified for a given report, it is possible that certain passes of SQL may apply the security filter differently as the passes may analyze data at different levels. Of course, it may apply differently to different levels of element browsing.

Fact security filters may include a security filter associated with a fact (or a fact group) for a given user (or group of users). The fact security filter may apply to a corresponding pass of a given report if the pass analyzes the data from that fact (e.g., at certain levels if the security filter comes with Top/Bottom levels).

For a given user (or group), a fact may supply different security filters with different Top/Bottom levels. If there is no overlap among the Top/Bottom ranges of different security filters, then the security filter whose Top/Bottom range the analysis level is associated with may be selected. When there is overlap among different security filter's Top/Bottom ranges, then the security filter that the analysis level falls into may be selected.

For example, a logical pass of a given report may analyze the data involving multiple facts at the same (or similar) level where the facts may come with different fact security filters. Fact security filters may include one fact with a fact security filter, one without security filter, and one with different fact security filter (maybe same filter, but different Top/bottom). In these cases, the logical one pass may be split into multiple passes according to their fact security filters. Subproject filters may also be implemented.

According to another embodiment of the present invention, multiple security filters may be combined. When a user executes a report, several security filters may be used for a given analysis. For example, a user may be a member of multiple groups. Also, a user and/or some of the user's groups may have different security filters. A fact may be derived from overlapped Top/Bottom different security filters. A fact may be derived from a security filter, which may be different from a user security filter.

A general rule for combining security filters may dictate that when two security filters' filter key level are the same (or similar) or have a refinement relationship, then the two filters may form a union. In addition, the Top level may be defined as the highest level that is lower than or the same as both original levels, and the bottom level may be defined as the lowest level that is higher than or same as both original levels. When two security filters' filter key are neither the same, nor do they have refinement relationship, then these two filters may intersect. The Top/Bottom levels may also intersect.

FIG. 5 illustrates an example of a combination of security filters, according to an embodiment of the present invention. Security filter 510 and security filter 520 may be combined and applied to data to filter information based on combined security filter 530. In this example, the filter expression may combine the filter expression of 510 and 520 to result in a combined region encompassing the East and Central regions.

Figure 6:
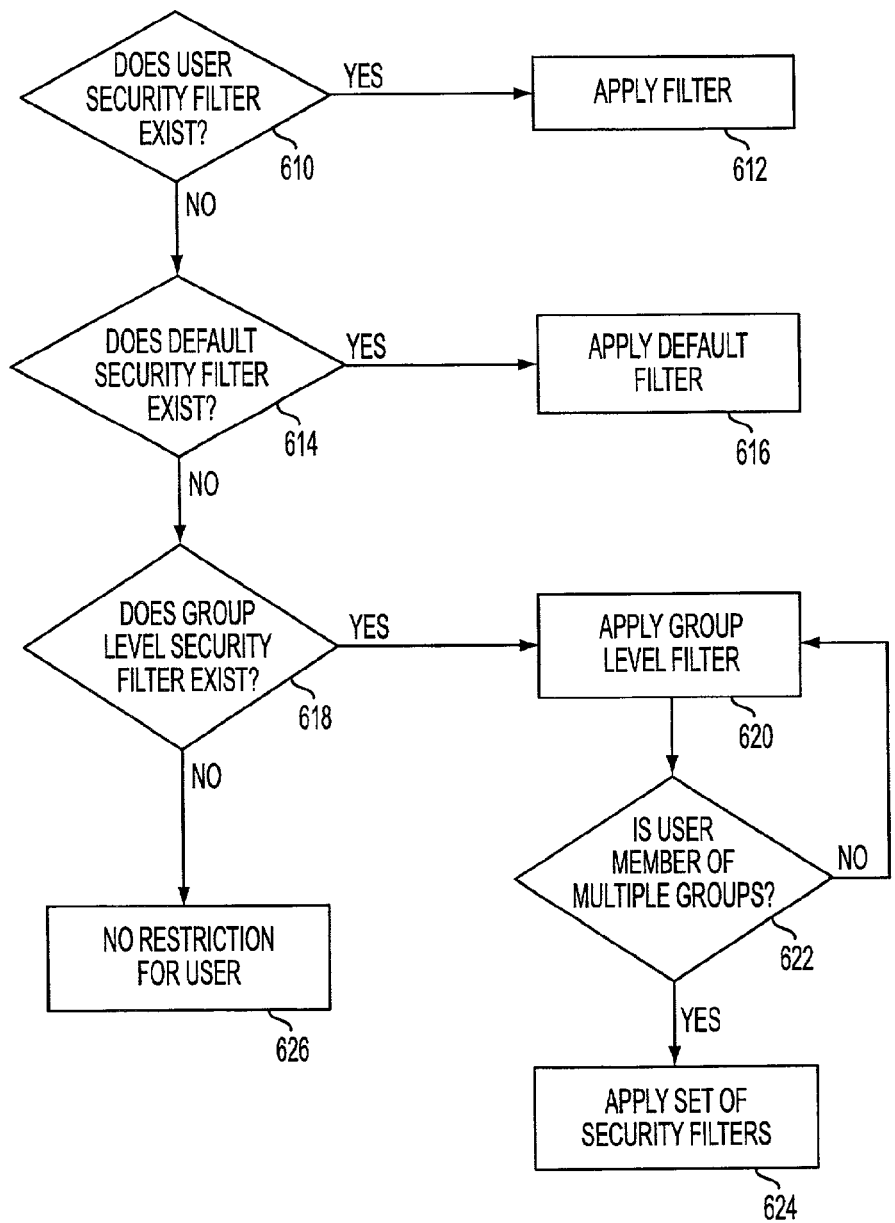
FIG. 6 is an example of a process for applying security filters, according to an embodiment of the present invention.

FIG. 6 is an example of a process for applying security filters, according to an embodiment of the present invention. At step 610, it may be determined whether a user security filter has been explicitly defined for the project. If so, the user security filter may be used at 612. At step 614, it may be determined whether a default security filter has been defined for the user. If so, the default security filter may be used at 616. At step 618, it may be determined whether a security filter for the group, either explicitly or by default, has been defined. If so, the group level filter may be applied at 620. At step 622, membership with multiple groups may be determined. At step 624, a set of security filters may be applied. If there is no security filter defined in either user and group level, then there is no restriction for the user, as illustrated by step 626.

Figure 7:
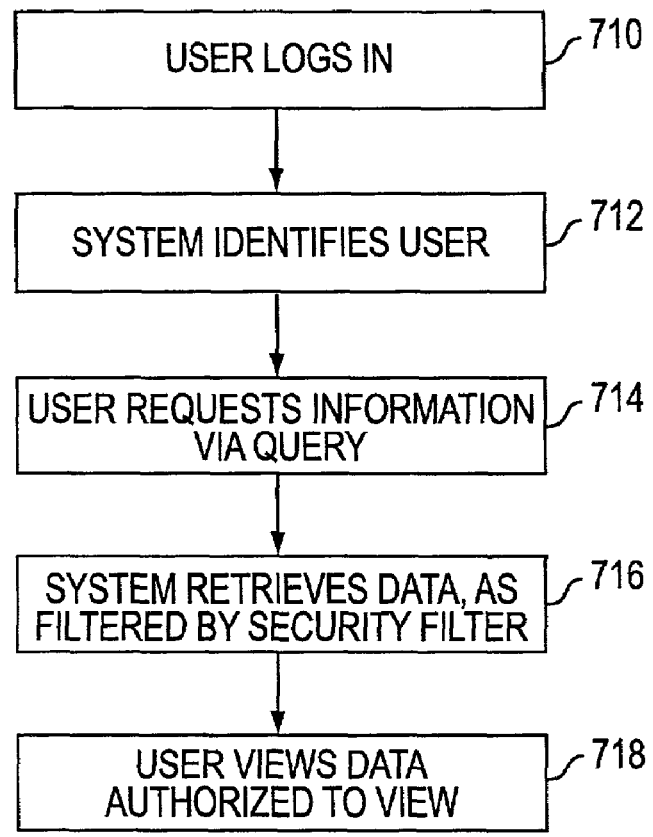
FIG. 7 is an example of a process for implementing security filters, according to an embodiment of the present invention.

FIG. 7 is an example of a process for implementing security filters, according to an embodiment of the present invention. At step 710, a user may login into a system. This may involve the user providing a login and password combination. At step 712, the system may identify the user and associate one or more security filters based on user data, project data and/or other information. At step 714, the user may submit a request for information, which may be in the form of a query or other format. For example, the system may receive data related to who submitted the request for a report (or other output), who is the intended recipient (e.g., in the case of a report or an alert), and other information, such as whether the report (or other output) may be received by several individuals who may have different security permissions. At step 716, the system may retrieve the requested data, which may be filtered by the appropriate one or more security filters. At step 718, the user may view, manipulate, or otherwise access data as authorized. While the user may request a greater scope of information, the user may be allowed to view data of which the user is authorized to view or otherwise access.

In addition to security filters, connection mapping may be implemented to provide control over data-level security. Connection mapping may apply to warehouse or other databases. By default, a user may use a database login/password pair when submitting queries to a warehouse or other database. Within a project using a particular warehouse, each user may be mapped to a different connection and/or a different login.

An abstraction layer between Business Intelligence (BI) users and database users may be implemented in accordance with the present invention. For example, a BI user may log into a BI server and then be mapped to a defined database username and login so that the BI user does not need an additional database username and login. Users may be associated with one or more groups where groups may be mapped to database logins. In addition, database logins may be hidden from BI users so that BI users do not have a known account to the database.

Figure 8:
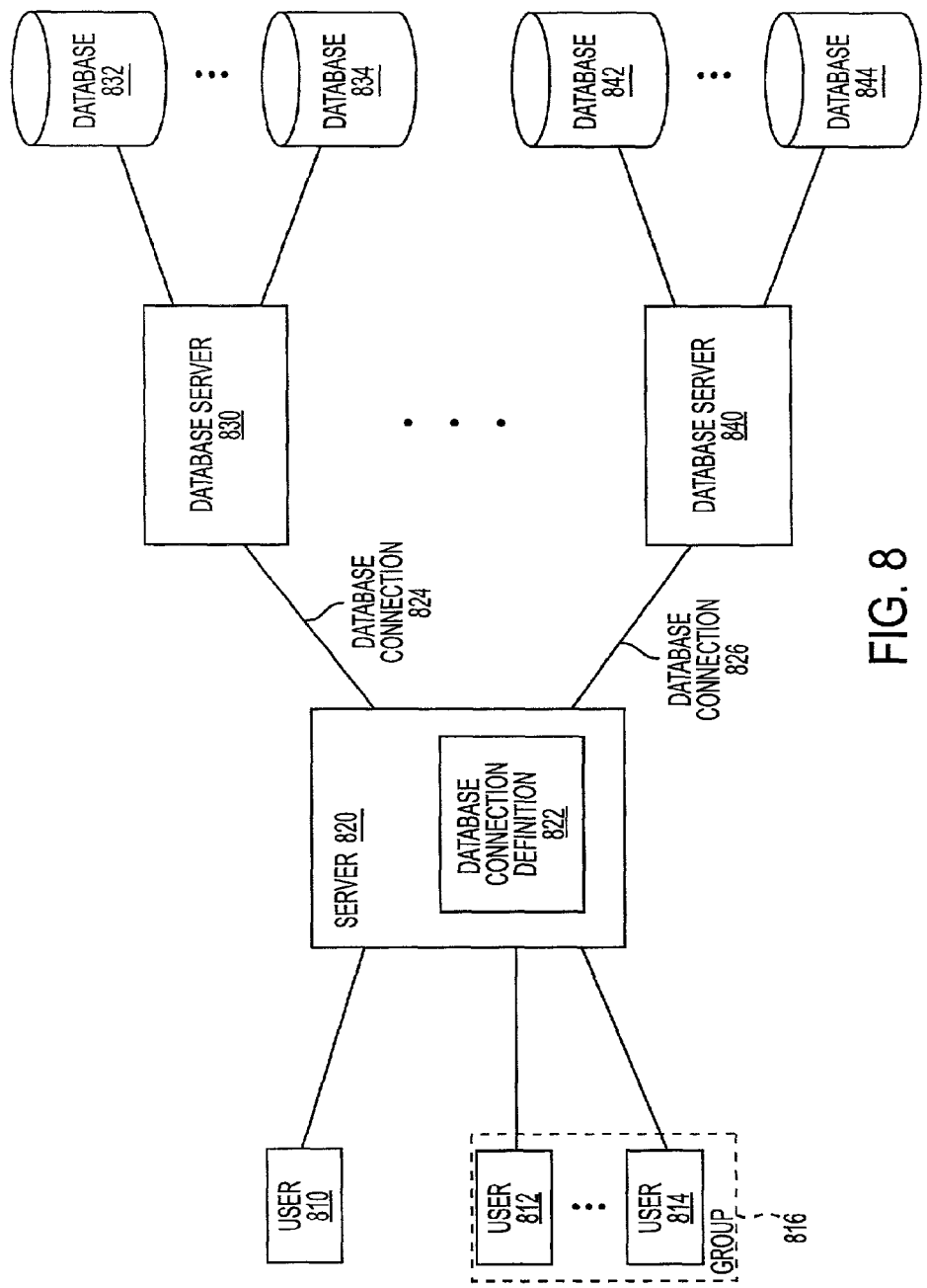
FIG. 8 illustrates an example of a system supporting database connection mapping functionality, according to an embodiment of the present invention.

FIG. 8 illustrates an example of a system supporting database connection mapping functionality, according to an embodiment of the present invention. One or more users 810 may access server 820. In addition, user 812 and/or user 814 may access server 820 where user 812 and user 814 may be associated with group 816. Server 820 may include database connection definitions, as illustrated by 822. Server 820 may establish database connection 824, 826 to database server 830, 840 which may then be connected to one or more databases, as illustrated by 832, 834, 842, and 844. Open Database Connectivity (ODBC) is a method of communicating with databases or database servers. Server 820 of the present invention may use ODBC to connect and communicate with databases and/or database servers in the system.

Database connection 824, 826 may include a physical ODBC connection to a database, such as a RDBMS. A single database connection may be used to execute some or all queries in a multi-pass report. A database connection definition 822 may include an ODBC data source name (DSN) and a set of ODBC properties that may be used to make an ODBC connection. ODBC DSN may store information for locating and logging into a database. A DSN may include information, such as host machine name or IP address, instance name and database name. Other ODBC properties may include information that may be used to connect to a database server, such as user ID and password for logging into a database server.

One feature of the present invention is to provide a server that supports security functionality to control the access to databases, thereby guaranteeing efficient use of database resources. As database connectivity is handled by server 820, centralized control of database access may be achieved. Various advantages of centralized control may be realized. For example, as the server establishes and maintains database connectivity, the need to rely on identically configured connections on client and server machines may be eliminated. This makes it easy to set up, deploy and manage large systems. In addition, the centralized control of the present invention further provides connection caching enabling the server to reuse database connections thereby minimizing the overhead associated with repeated connecting to and disconnecting from databases. Load balancing may also be achieved because the server may ensure that no single database becomes overloaded with user requests. The server may also map users to database logins thereby allowing multiple users to access the database using a single database login.

According to an embodiment of the present invention, database connection mapping may involve the ability to map multiple users (e.g., DSS users) to the same database login as well as the ability to map different users (e.g., DSS users) to different database logins This may limit the number of database logins that an administrator may use to create in order to support a large user community. In some architectures, a separate database login may be created for group of users, as shown by 816. For example, users in the marketing department may execute queries on the RDBMS as MKTGUSER and users in the technology department execute queries on the RDBMS as TECHUSER. User groups 816 may also be mapped to connection definitions and logins, just like users. In some instances, it may be easier for the administrator to manage mapping by groups rather than individual users.

Multiple users (e.g., DSS users) may be mapped to the same (similar or related) database connection definition 822. The present invention provides the ability to map different DSS users to different database connection definitions. This may allow administrators to load balance the query volume on the RDBMS. Some RDBMS may support ODBC settings that may indicate on which node in the database server a query should be executed. Since these settings are part of the database connection definition, different database connection definitions may correspond to different nodes in the database server. Using connection mapping, the administrator may manually map different portions of the user community to different database server nodes. For example, DB2/UDB may allow ODBC DSN's to be defined to connect to a specific node in the database server. Connection mapping may be used to achieve various results. For example, users in the marketing department may execute queries against the DB2 node DBNODE1. Users in the technology department may execute queries against the DB2 node DBNODE2.

Database connection mapping may enable an administrator to map (User, DBRole) to (DBConnection, DBLogin) for each project. For every database used as a warehouse, each user may be mapped to a different database connection definition and database login, for example. The mapping may apply to warehouse connections. If a user belongs to more than one user group, and these groups map to different (DBConnection, DBLogin) pairs, then server 820 may arbitrarily choose a pair to make the connection. However, from query to query for the same user, the server 820 may choose the same pair. That is, if a user is a member of more than one group, the Server may not connect as login A some of the time and login B some of the time. For example, the user may use any connection definition or login that may be used by an associated group. If the administrator needs to guarantee the login used by each user, then the administrator may construct a set of mutually exclusive groups to use for database connection mapping. If no mapping is defined, then a default (DBConnection, DBLogin) pair may be used for some or all users. Similarly, if a map exists, but a user is not found in the map, then the default pair will be used.

At the application level, security may be enhanced by users and groups definitions; user authentication; access rights, privileges, security roles and other mechanisms.

Users may be members of multiple groups. In addition, groups within groups may be possible. Users and groups may be stored in a repository and may be shared among several servers, projects, etc. Built-in groups may include everyone, public, system monitors, system administrators, web Standard Edition (SE) users and web Professional Edition (PE) users. Other users and/or groups may be defined.

All (or some) users may be implicitly members of the Everyone group. The Everyone group may be provided as a convenience for assigning privileges, security role memberships, etc.

The Public group may provide the capability for anonymous logins and may be used to manage access rights of guest users. If anonymous authentication is permitted on the server and on projects within the server, each guest user may assume the "profile" defined by the Public group. When a user logs in as "guest," a user may be created dynamically and become a member of the Public group.

The System Monitors group may provide a way to give users administrative capabilities in the system. Making users members of the System Monitors group allows users to inherit system-wide privileges as well as access rights on specific configuration objects and folders.

The Systems Administrators group may be a group within the System Monitors group. This group may provide some or all the capabilities of the System Monitors group, plus some additional administrative ability.

The Web SE Users group may provide an easy way to give users privileges to access application functionality through various web and other applications (e.g., MSTR-7 Web). The Web SE group may be assigned privileges associated with "standard" web and other functionality.

The Web PE Users group may provide an easy way to give users privileges to access advanced application functionality through various web and other applications (e.g., MSTR-7 Web). The Web PE group may be assigned privileges associated with advanced web functionality. The Web PE group may include a group within the Web SE group where it may provide some or all the privileges of the Web SE group, plus additional privileges.

Figure 9:
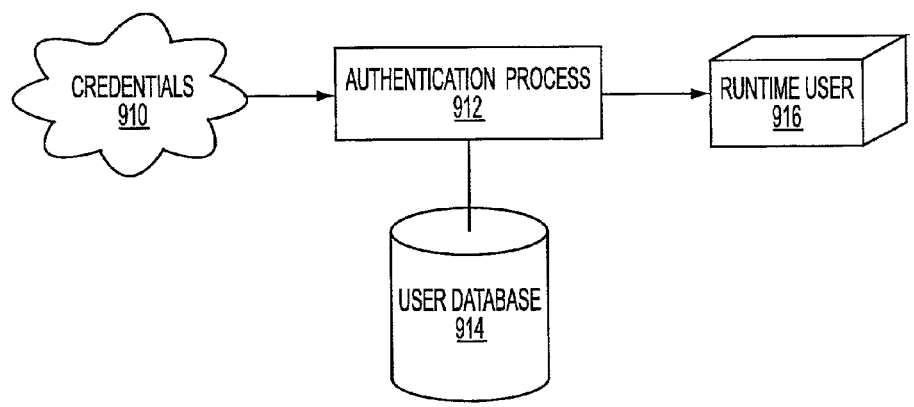
FIG. 9 illustrates an example of a system for supporting authentication processes, in accordance with an embodiment of the present invention.

Authentication is the process of validating the identity of a user. Authentication may be an initial phase of a secure system. Successful authentication of a user may grant the user the right to use the system. FIG. 9 illustrates an example of a system for supporting authentication processes, in accordance with an embodiment of the present invention. A user may supply credentials 910 which may uniquely identify the user to the system. Authentication process 912 may utilize user database 914 to perform various functions, such as determining whether the supplied credentials are correct and producing a runtime user object, for example. User database 914 may store data related to users and groups. User database 914 may include a resource-level metadata to store objects which may exist outside the confines of a single project. In addition, server level objects may reside in the user database as well. Runtime user 916 may embody the information to securely access objects, use system services and perform other functions.

Examples of credentials may include user name and password, identity (e.g., Microsoft Windows™ NT™ identity, data warehouse login name and password, custom credentials and other formats.

Authentication types that may be supported by the present invention, may include Standard Mode authentication, Microsoft Window™ NT™ authentication, Pass-through authentication, and anonymous authentication. Other types of authentication may be implemented.

For Standard mode authentication, the server may store user ids and passwords and validate credentials. For Microsoft Windows™ NT™ authentication, the server may rely on Microsoft Windows™ NT™ to authenticate users. As such, the identity of the logged on user may be used rather than requesting the user to supply additional credentials. Other authentication associated with other operating systems may be implemented in accordance with the present invention. For pass-through authentication, the server may pass credentials through to a RDBMS to authenticate users. For anonymous authentication, the server may provide the ability to create an anonymous session through the API, without the user providing the actual string for the username.

For example, the present invention may support an anonymous authentication mode for guest users. Guest users may inherit privileges from the Public group, for example. The capabilities of the Public group may be controlled via the ACL for the various objects to which the public group is given access. To enable anonymous access to a server, the administrator may grant a certain level of access on the server to the Public group. To enable anonymous access to a project, the administrator may include the Public group in a role membership for the project. When connecting as an anonymous user, a new user runtime may be created so that the Inbox may not be shared with other anonymous users. When disconnecting from an anonymous session, the Inbox may be cleared out. Anonymous users may create objects that may be shared by some or all other anonymous users.

Access control may be implemented to determine what the user may be allowed to see, do or access, once the user has been identified to the system. Access control may include privileges and permissions. Privileges may define the types of actions that particular users and groups may perform in the system. Permissions may define which users and groups have access to what objects and the degree to which the user may access those objects.

Figure 10:
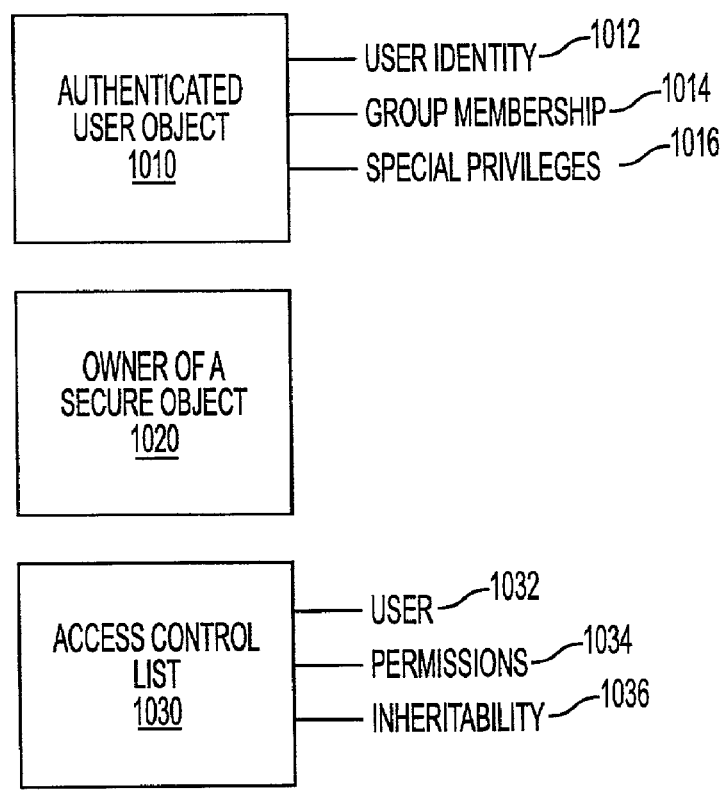
FIG. 10 is an example of components associated with access control rights, according to an embodiment of the present invention.

FIG. 10 is an example of components associated with access control rights, according to an embodiment of the present invention. Components for implementing access control may include an authenticated user object 1010, an owner of a secure object 1020, and an access control list (ACL) 1030. Other components may be implemented.

Authenticated user object 1010 may include information related to user identity 1012, group membership 1014 and special privileges 1016. User identity 1012 may be used for determining object ownership and identifying whether the user was granted the right to use the object. Group membership 1014 may be used for establishing access to the object. For example, a user may be granted access to an object if the user belongs to a group which is granted access. Special privileges 1016 may apply when a user may be associated with a special privilege which may cause normal access checks to be bypassed.

An object owner 1020 may be the user who created the object. Objects may maintain a record of current owners. This may be useful for determining whether implicit rights should granted to a user. An owner of an object (or an administrator) may have the implicit right to define who may access the object and what type of access may be granted.

An access control list of an object may include a list of users and groups and the permissions that each one has for a particular object (or group of objects). Access control lists 1030 may include information related to user 1032, permissions 1034 and inheritability 1036. User information 1032 may include the name of the user or group which may be granted or denied access to the object. Permissions 1034 may include the degree to which the user or group may be granted or denied access to the object. Examples of permissions may include browse, use/execute, read, write, delete, control and other permissions. Inheritable information 1036 may relate to folders. If set, any objects placed in a folder may inherit a folder's entry in the access control list. For example, some rights may apply directly to an object while others may apply to objects contained within other objects (e.g., folders, etc.).

When a server command is requested, the server may check certain access rights to determine if a particular command may be executed. In general, the server may check access rights on a Server Definition object, for example, that may be used to initialize the server at startup. This allows users to have different capabilities on different servers within the same system. For example, in order to disconnect another user from the server, the user may have an associated Use/Execute access on the current server.

An ACL Editor may map access rights to various groupings that may be displayed to the user. Such groupings may include view, modify, and full control, for example. In addition, access rights control functionality may be specific to a server definition. For example, server rights that may be assigned for each individual server may include configuration, monitoring, and administration. Server commands may be associated with groupings of access rights. For example, server configuration may be associated with access rights, such as write, delete, control access. Server monitoring may be associated with access right, such as read access. Server administration may be associated with user/execute access; and Default may be associated with browse access. Other variations may be implemented.

When a user is running a report that may have some metrics inaccessible (e.g., cannot be viewed) to the user, a report may be executed regardless. Generally, a report may be allowed to execute even if inaccessible objects may be contained in the report. To address this issue, the present invention provides logic that may handle various types of security conflicts in reports.

According to an embodiment of the present invention, metrics may be removed before the report is executed. For example, a project administrator may build many base reports that each have metrics for individual users to run. A user may be restricted to a view of the metrics that the user is permitted to view. As a result, different users may view different reports.

For example, a user may be granted the right to execute a report if the user has use/execute permission on that report definition object, regardless of the user's access to objects that make up the report in question. According to another embodiment of the present invention, access rights model may allow a controller of an object to specify that a trustee may not execute any report that contains the object. A trustee may include a user or group explicitly granted or denied access to an object.

According to an embodiment of the present invention, privileges may apply independent of any object in particular. Categories of privileges may include object creation privileges, application access privileges, and system-wide privileges. For example, object creation privileges may govern whether a user has the ability to create a new object. Application access privileges may be used by GUI programmers to govern which portions of the application may be used. For example, desktop and web applications may use application privileges. System-wide privileges may govern functionality that may apply at a system level. Other variations may be implemented.

According to an embodiment of the present invention, security roles may involve collections of privileges. Security roles may be reused across projects. For example, within a project, a security role membership may indicate the privileges possessed by users/groups within that project. Other variations may be implemented.

For example, a security role may be created which may allow users to access all editors except for a specific editor (e.g., a Document Editor). Once this security role has been created, it may be saved and implemented in a project registered with the server. The users associated with a particular security role may vary by project.

Examples of security roles may include normal users and power users. Normal users security role may no privileges granted. Power users security roles may have all privileges granted. Other variations may be implemented.

Another embodiment of the present invention provides security and user account integration with remote authentication servers, (e.g., repositories not owned by the server). Integration may occur with Lightweight Directory Access Protocol (LDAP), Microsoft Windows™ NT™ authentication, custom account repositories and others. For example, the server may synchronize associated user lists with a remote repository. In another example, the server may also make external calls to remote authentication servers to validate a user's username and password. Other information may be validated.

LDAP may relate to a directory-structured way to store data. In particular, many customers may use LDAP to store user information across an organization or customer-base. Rather than creating a new set of users within an entity and/or system, customers may use existing user information stored in LDAP to perform authentication, access checks and other functions.

Customers may use LDAP to authenticate users so that the users may use a single user ID and password. In addition, certificates may be used instead of user ID and password where appropriate. LDAP repositories may store information that describes properties, roles and rights of a user for authorization and other purposes. It may be possible to store vendor-specific information in a LDAP repository and enable applications to read from the LDAP repository rather than from a proprietary data store. To do this may involve changes in the LDAP schema where user properties, such as privileges, may be stored in a LDAP repository. LDAP schema may be changed under certain conditions, such as functional gain or improved architecture.

In addition, LDAP may support the concept of groups. For example, during authorization, LDAP groups may be associated with other (e.g., MicroStrategy) groups at login. This may remove the need to administer user assignment to groups at both the LDAP and other (e.g., MicroStrategy) level. For example, authentication may occur through a web site or other Internet user interface (e.g., MicroStrategy Web). As a result, the present invention may provide a way to achieve single-sign-on for web and other users.

After the user has been authenticated against the LDAP server, the user may be mapped to an application specific user (e.g., MicroStrategy user) or a user context may be created at run time. Mapping users may involve an import utility. Similarly, authentication may occur through a desktop interface (e.g., MicroStrategy Desktop).

For LDAP integration, single-sign-on may include identifying the user from an operating system user session, using the same (similar or related) user ID and password for some or all applications (even if it is entered multiple times) and authenticating using certificates. In addition, efficiencies may be realized by less administrative tasks at various appropriate levels. For example, groups may be assigned in a LDAP repository and application specific details (permissions, privileges) may be assigned in the application (e.g., MicroStrategy) repository. Other variations may be implemented.

Other features may include mapping LDAP users to existing users (e.g., MicroStrategy users) and creating a user (e.g., MicroStrategy user) given LDAP information. A user, for example, may be created based on information from the LDAP repository. However, the user's individual permissions and privileges may be based on the groups in the metadata (e.g., MicroStrategy metadata) that represent groups in the LDAP repository. This feature may be of particular importance at the group level.

In addition, the present invention may create specific groups and individual user privileges based on LDAP repository, ACL LDAP lookups and/or other data. This may allow users to be assigned privileges according to information stored with that user in the LDAP repository. This may invoke LDAP schema changes. In addition, by creating groups from information in the repository, the need to import such information may be removed. Further, access control may be assigned to a user in the LDAP repository where a LDAP server may be accessed to perform ACL checks.

Figure 11:
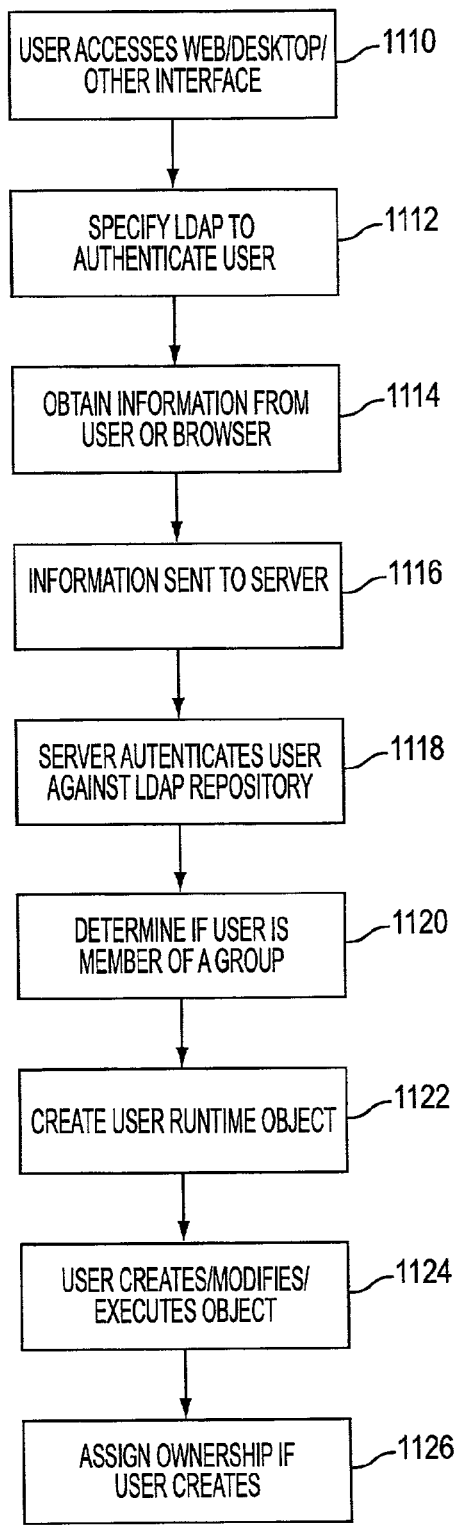
FIG. 11 illustrates a flowchart for LDAP integration, according to an embodiment of the present invention.

FIG. 11 illustrates a flowchart for LDAP integration, according to an embodiment of the present invention. At step 1110, a user may access a web site, desktop or other interface. At step 1112, a data source may specify that LDAP may be used to authenticate the user, including the type of information that may be used (e.g., user ID, password, certificate, etc.). Other authentication methods may be specified. At step 1114, information may be obtained from a user or a browser (e.g., login box for user ID, password or certificate request). At step 1116, the information may be sent to a server. At step 1118, the server may authenticate the user against the LDAP repository. At step 1120, it may be determined if authenticated requests groups which the user is a member. At step 1122, a user runtime object based on access to the groups may be created. For example, an administrator (e.g., MicroStrategy administrator) may set up certain groups (e.g., in MicroStrategy) with corresponding distinguished names in the LDAP repository. The user may be assigned group membership according to these mappings. At step 1124, the user may then create, modify, and/or execute objects according to the permissions and/or privileges assigned from the groups. At step 1126, if the user creates an object, the ownership may be assigned as the group, rather than the particular user.

LDAP security may support such features as single-sign-on through various user interfaces, such as desktop, web or other interfaces where one login/password pair may be used. In addition, anonymous logins may be supported. LDAP user and LDAP groups with user control may be implicitly imported wherein privilege and access control may be based on imported users and/or groups or default LDAP user groups. As a result, a DSSUser may represent LDAP user and/or LDAP group. User/group administration/management (e.g., privileges, project role memberships, ACL, etc.) information may be retrieved from the imported LDAP user and/or LDAP group.

Figure 12:
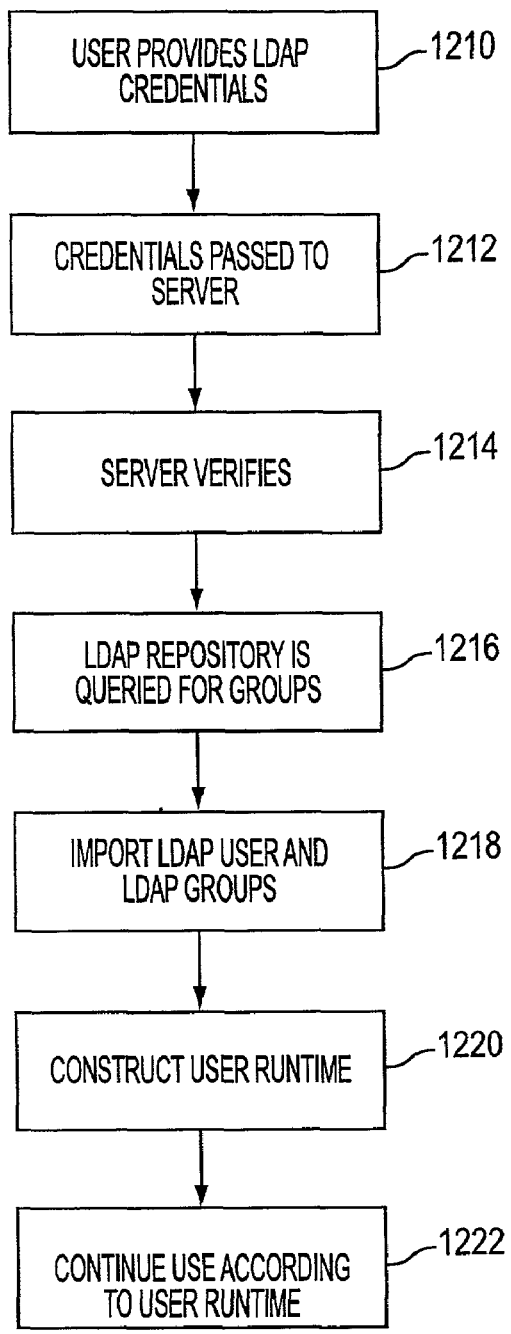
FIG. 12 illustrates an integrated LDAP authentication and authorization flowchart, according to an embodiment of the present invention.

FIG. 12 illustrates an integrated LDAP authentication and authorization flowchart, according to an embodiment of the present invention. At step 1210, a user may provide LDAP credentials (e.g., login and password) to a user interface, such as a Desktop or Web. At step 1212, the credentials may be passed to the server. At step 1214, the server may verify the credentials against the LDAP repository. At step 1216, once authenticated, the LDAP repository may be queried for the groups for which that user is a member. At step 1218, the LDAP user and the LDAP groups may be imported, if they do not exist in metadata. At step 1220, a user runtime may be constructed based on the login user and groups (e.g., plus the predefined LDAPUserGroup). In addition, object creation privileges may be dropped. At step 1222, the user may continue to use applications (e.g., Microstrategy 7) according to user runtime.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A method for integrating security and user account data in a reporting system with at least one remote repository, comprising the steps of:
    enabling a user to submit user credential input to a reporting system, wherein the reporting system comprises an On-Line Analytical Processing (OLAP) decision support system (DSS);
    identifying an authentication process from a plurality of authentication processes comprising a standard-mode authentication, pass-through authentication, and anonymous authentication, wherein the standard-mode authentication comprises using a user identification and password to validate credentials, the pass-through authentication comprises using a relational database management system (RDBMS) to authenticate users, and the anonymous authentication comprises creating an anonymous session through the API without user identification;
    forwarding the user credential input to a first server; and
    enabling the first server to apply the authentication process to authenticate the user against a remote repository using Open Database Connectivity (ODBC) for verifying the user credential input and to determine user access control data for identifying a least one user privilege for performing one or more actions and at least one user permission associated with one or more objects, wherein the remote repository is located within a second server, the second server being different from the first server.

2. The method of claim 1 further comprising a step of importing user information from the remote repository.

3. The method of claim 2 further comprising a step of enabling the server to synchronize user account data with the user information from the remote repository.

4. The method of claim 2 wherein the user information comprises at least one or user permissions, privileges and access rights associated with the user.

5. The method of claim 1 wherein the authentication process comprises Lightweight Directory Access Protocol.

6. The method of claim 1 wherein the authentication process comprises an operating system authentication.

7. The method of claim 1 wherein the user is associated with a group of users wherein group information from the remote repository is imported.

8. A system for integrating security and user account data in a reporting system with at least one remote repository, comprising:
    an input for enabling a user to submit user credential input to a reporting system, wherein the reporting system comprises an On-Line Analytical Processing (OLAP) decision support system (DSS);
    an identification module for identifying an authentication process from a plurality of authentication processes comprising a standard-mode authentication, pass-through authentication, and anonymous authentication, wherein the standard-mode authentication comprises using a user identification and password to validate credentials, the pass-through authentication comprises using a relational database management system (RDBMS) to authenticate users, and the anonymous authentication comprises creating an anonymous session through the API without user identification;
    a forwarding module for forwarding the user credential input to a first server; and
    a first server for applying the authentication process to authenticate the user against a remote repository using Open Database Connectivity (ODBC) for verifying the user credential input and to determine user access control data for identifying a least one user privilege for performing one or more actions and at least one user permission associated with one or more objects, wherein the remote repository is located within a second server, the second server being different from the first server.

9. The system of claim 8 further comprising an import module for importing user information from the remote repository.

10. The system of claim 9 wherein the server synchronizes user account data with the user information from the remote repository.

11. The system of claim 9 wherein the user information comprises at least one or user permissions, privileges and access rights associated with the user.

12. The system of claim 8 wherein the authentication process comprises Lightweight Directory Access Protocol.

13. The system of claim 8 wherein the authentication process comprises an operating system authentication.

14. The system of claim 8 wherein the user is associated with a group of users wherein group information from the remote repository is imported.

15. A non-transitory processor-readable medium comprising instructions for execution by a processor to integrate security and user account data in a reporting system with at least one remote repository, the medium comprising:
- instructions for causing a processor to enable a user to submit user credential input to a reporting system, wherein the reporting system comprises an On-Line Analytical Processing (OLAP) decision support system (DSS);
- instructions for causing a processor to identify an authentication process from a plurality of authentication processes comprising a standard-mode authentication, pass-through authentication, and anonymous authentication, wherein the standard-mode authentication comprises using a user identification and password to validate credentials, the pass-through authentication comprises using a relational database management system (RDBMS) to authenticate users, and the anonymous authentication comprises creating an anonymous session through the API without user identification;
- instructions for causing a processor to forward the user credential input to a first server; and
- instructions for causing a processor to enable the first server to apply the authentication process to authenticate the user against a remote repository using Open Database Connectivity (ODBC) for verifying the user credential input and to determine user access control data for identifying a least one user privilege for performing one or more actions and at least one user permission associated with one or more objects, wherein the remote repository is located within a second server, the second server being different from the first server.

16. The medium of claim 15 further comprising code for causing a processor to import user information from the remote repository.

17. The medium of claim 16 further comprising code for causing a processor to enable the server to synchronize user account data with the user information from the remote repository.

18. The medium of claim 16 wherein the user information comprises at least one or user permissions, privileges and access rights associated with the user.

19. The medium of claim 15 wherein the authentication process comprises at least one of Lightweight Directory Access Protocol and operating system authentication.

20. The medium of claim 15 wherein the user is associated with a group of users wherein group information from the remote repository is imported.

* * * * *